(12) United States Patent
Netsu et al.

(10) Patent No.: US 11,945,147 B2
(45) Date of Patent: Apr. 2, 2024

(54) VEHICLE INTERIOR AND EXTERIOR MEMBER, METHOD OF MANUFACTURING VEHICLE INTERIOR AND EXTERIOR MEMBER, AND PRESS MOLD USED FOR MANUFACTURING VEHICLE INTERIOR AND EXTERIOR MEMBER

(71) Applicant: HOWA CO., LTD., Kasugai (JP)

(72) Inventors: Masayo Netsu, Kasugai (JP); Yohei Sone, Kasugai (JP); Masaki Namie, Kasugai (JP)

(73) Assignee: Howa Co. Ltd., Kusagai (JP)

( * ) Notice: Subject to any disclaimer, the term of this patent is extended or adjusted under 35 U.S.C. 154(b) by 393 days.

(21) Appl. No.: 17/261,767

(22) PCT Filed: Jan. 24, 2020

(86) PCT No.: PCT/JP2020/002495
§ 371 (c)(1),
(2) Date: Jan. 20, 2021

(87) PCT Pub. No.: WO2020/158600
PCT Pub. Date: Aug. 6, 2020

(65) Prior Publication Data
US 2021/0187805 A1    Jun. 24, 2021

(30) Foreign Application Priority Data
Jan. 30, 2019 (JP) .................. 2019-013955

(51) Int. Cl.
*B29C 45/56*    (2006.01)
*B29C 45/14*    (2006.01)
(Continued)

(52) U.S. Cl.
CPC ...... *B29C 45/561* (2013.01); *B29C 45/14786* (2013.01); *B29C 45/14795* (2013.01);
(Continued)

(58) Field of Classification Search
CPC ...... B29C 2045/0093; B29C 2793/009; B29C 33/38; B29C 43/20; B29C 43/36;
(Continued)

(56) References Cited

U.S. PATENT DOCUMENTS

| 5,173,227 A * | 12/1992 | Ewen ............. B29C 44/16 264/258 |
| 6,984,445 B1 * | 1/2006 | Yamagata ........... B32B 5/022 428/319.3 |

FOREIGN PATENT DOCUMENTS

| DE | 102015013193 A1 * | 4/2017 | ......... B29C 45/1418 |
| JP | S61-186445 A | 8/1986 | |

(Continued)

OTHER PUBLICATIONS

Translation of DE 102015013193, Eckhard Reese, Apr. 13, 2017. (Year: 2017).*

(Continued)

*Primary Examiner* — Hai Vo
(74) *Attorney, Agent, or Firm* — Jonathan Pierce; Pierre Campanac; Porter Hedges LLP

(57) ABSTRACT

A vehicle interior and exterior member comprises a fiber molded body and a synthetic resin member fixed to a surface of the fiber molded body. The fiber molded body has a fiber layer including thermoplastic synthetic resin as a base material layer. The base material layer has fiber layer surfaces on its both surfaces or, the base material layer has another fiber layer including the other type of thermoplastic synthetic resin on one of the fiber layer surface to form a fiber laminated body. The fiber molded body is formed by molding the fiber laminated body into a three-dimensional face shape. The synthetic resin member has a fixed portion which is fixed to the fiber molded body by solidifying it in (Continued)

a state that molten synthetic resin has seeped into the fiber layer of the fiber laminated body.

12 Claims, 4 Drawing Sheets

(51) Int. Cl.
*B29C 70/46* (2006.01)
*B29L 31/30* (2006.01)
*B32B 5/18* (2006.01)
*B32B 5/24* (2006.01)

(52) U.S. Cl.
CPC ........ *B29C 45/14811* (2013.01); *B29C 70/46* (2013.01); *B32B 5/18* (2013.01); *B32B 5/245* (2013.01); *B29L 2031/3041* (2013.01); *B32B 2266/08* (2013.01)

(58) Field of Classification Search
CPC .............. B29C 44/00; B29C 45/14786; B29C 45/14795; B29C 45/14811; B29C 45/561; B29C 69/02; B29C 70/46; B29L 2031/3041; B32B 2266/08; B32B 5/18; B32B 5/245; B32B 5/28; B60R 13/02

See application file for complete search history.

(56) References Cited

FOREIGN PATENT DOCUMENTS

| | | |
|---|---|---|
| JP | 2003-039512 A | 2/2003 |
| JP | 2003-055622 A | 2/2003 |
| JP | 2005-238518 A | 9/2005 |
| JP | 2007-125759 A | 5/2007 |
| JP | 2011-230341 A | 11/2011 |
| JP | 2012-040861 A | 3/2012 |
| JP | 2018-176979 A | 11/2018 |

OTHER PUBLICATIONS

Written Opinion of the International Searching Authority in international application PCT/JP2020/002495 dated Apr. 7, 2020, 6 pages.

* cited by examiner

VEHICLE INTERIOR AND EXTERIOR MEMBER, METHOD OF MANUFACTURING VEHICLE INTERIOR AND EXTERIOR MEMBER, AND PRESS MOLD USED FOR MANUFACTURING VEHICLE INTERIOR AND EXTERIOR MEMBER

CROSS-REFERENCE TO RELATED APPLICATIONS

The present application is a U.S. National Phase entry of, and claims priority to, PCT Application No. PCT/JP2020/002495, filed Jan. 24, 2020, which claims priority to Japanese Patent Application No. 2019-013955, filed Jan. 30, 2019, all of which are incorporated herein by reference in their entireties for all purposes.

BACKGROUND

The present disclosure relates to a vehicle interior and exterior member, a method of manufacturing the vehicle interior and exterior member, and a press mold used for manufacturing the vehicle interior and exterior member.

It is known that a fiber molded body, having a fiber layer containing thermoplastic synthetic resin, can be used for a vehicle interior and exterior member. Such vehicle interior and exterior member usually has synthetic resin members, such as fixing members, used for fixing the vehicle interior and exterior member to a vehicle body, deformation preventing members, and rigidity securing members. Such kind of fiber molded body has a fiber layer containing thermoplastic resin on its surfaces. Thus, adhesives, such as a hot-melt adhesive, have been used to tightly attach synthetic resin members to the fiber molded body. However, there are concerns with such use of adhesives, such as a hot-melt adhesives, for synthetic resin members, as described below.

Firstly, molding die equipment for separately manufacturing a synthetic resin member is necessary. Further, an installation location of the molding die and staff are needed. Additionally, equipment, such as a jig, is required to accurately attach the synthetic resin member on the fiber molded body. These requirements lead to increased costs. Furthermore, the synthetic resin member is required to have an attaching seat surface area for use with the adhesives, such as a hot-melt adhesive. This would lead to an increase in weight of the synthetic resin member. Additionally, it takes time to affix a synthetic resin member with such adhesives. Thus, it is further desired to reduce the number of man-hours required for assembly. Further, such adhesives can deteriorate over time and generate volatile substances. Additionally, such adhesives are temporarily heated to high temperatures. Thus, temperature management may be complicated, so as to prevent deformation of the fiber molded body.

For example, Japanese Unexamined Patent Application No. 2005-238518 discloses a synthetic resin member attached to a vehicle interior and exterior member. In the disclosure of JP 2005-238518, an automobile interior member is composed of a foam resin base material, a resin rib integrally laminated on a back side of the foam resin base material, and a decorative material attached to a surface of the foam resin base material.

In the disclosure of JP 2005-238518, the resin rib is attached on the back side of the foam resin base material by injection molding. This allows the resin rib to be attached on the back side of the foam resin base material without using adhesives, such as a hot-melt adhesive. Additionally, the foam resin base material is used as the base material, and thus its rigidity is high. Accordingly, injection molding may be easily applicable for this technique.

SUMMARY

However, some fiber molded bodies have low rigidity compared to the above-mentioned foam resin base material. Thus, synthetic resin members have usually been attached by adhesives, such as a hot-melt adhesive.

Accordingly, it is desired to provide a vehicle interior and exterior member which allows synthetic resin members to be integrally attached to a fiber molded body without adhesives, a method of manufacturing such an vehicle interior and exterior member, and a press mold used for manufacturing such an vehicle interior and exterior member.

According to an embodiment of the present disclosure, a vehicle interior and exterior member comprises a fiber molded body and a synthetic resin member fixed to a surface of the fiber molded body. The fiber molded body has a fiber layer, including thermoplastic synthetic resin, as a base material layer. The base material layer has one or more additional fiber layer surfaces on one or both surface of the base material layer to form a fiber laminated body. The fiber molded body is formed by molding the fiber laminated body into a three-dimensional face shape. The synthetic resin member has a fixed portion which is fixed to the fiber molded body by solidifying the synthetic resin member in a state that molten synthetic resin as seeped into the fiber layer of the fiber laminated body.

One of the features and benefits of the present disclosure is as follows. The synthetic resin member has a fixed portion which is fixed to the fiber molded body by solidifying the synthetic resins member in a state that molten synthetic resin has seeped in the fiber layer of the fiber laminated body. Thus, the synthetic resin member can be firmly fixed to the fiber molded body due to an anchoring effect of the fixed portion. Additionally, the synthetic resin member does not need an attaching seat surface, and thus an increase of its weight can be inhibited. In this way, a vehicle interior and exterior member allows for the synthetic resin member to be integrally attached to the fiber molded body without adhesives, such as a hot-melt adhesive.

Regarding the above-mentioned vehicle interior and exterior member, the synthetic resin member may be solidified in a state where the synthetic resin member includes gas bubbles therein, as seen in a sectional view.

One of the features and benefits of the present disclosure is that the synthetic resin member may be solidified in a state of including gas bubbles therein. This can inhibit formation of sink marks on a surface of the fiber molded body opposite to an attaching surface, which is where the synthetic resin member is attached. A sink mark is a recess which can be formed by molding shrinkage of synthetic resins. Because molten synthetic resin can be solidified in a state of including gas bubbles inside, shrinkage of the resin may be inhibited during cooling. This allows a design surface of a vehicle interior and exterior member to be further beautifully finished.

Regarding the above-mentioned vehicle interior and exterior member, the gas bubbles located toward an inside of the synthetic resin member may be relatively larger than the gas bubbles located toward a surface side of the synthetic resin member.

One of the features and benefits of the present disclosure is as follows. That is, if the gas bubbles located toward the inside of the synthetic resin member are relatively larger than the gas bubbles located near the surface side of the synthetic resin member, the rigidity of the synthetic resin member can be ensured. Additionally, the weight of the synthetic resin member can be reduced.

Regarding the above-mentioned vehicle interior and exterior member, the gas bubbles included in the synthetic resin member may be concentrated in a portion near the fiber layer.

One of the features and benefits of the present disclosure is as follows. The above described structure allows the rigidity of the vehicle interior and exterior member to be ensured and the weight of the vehicle interior and exterior member to be reduced. Additionally, this can inhibit the formation of sink marks along the design surface of the vehicle interior and exterior member.

A method of manufacturing the vehicle interior and exterior member may comprises a heating step, a press molding step, and an injection molding step. In the heating step, the fiber laminated body is heated so as to be softened. In the press molding step, the fiber laminated body heated in the heating step is pressed by a press mold along both of its surfaces, so as to be cooled and pressurized to form the fiber molded body. In the injection molding step, molten synthetic resin, which includes gas to form gas bubbles in the synthetic resin member, is injected toward the fiber layer of the fiber laminated body so as to mold the synthetic resin member while the press molding step is proceeding.

One of the features and benefits of the present disclosure is that the method includes the injection molding step, where molten synthetic resin including gas to form gas bubbles in the synthetic resin member, is injected toward the fiber layer of the fiber laminated body. This allows the synthetic resin member to be molded while the press molding step is proceeding. Thus, equipment such as a jig is unnecessary to attach synthetic resin member. The positioning accuracy of the synthetic resin member can be increased by simultaneously performing the press molding step and the injection molding step. In this way, a method of manufacturing a vehicle interior and exterior member which allows the synthetic resin member to be integrally attached to the fiber molded body without adhesives, such as a hot-melt adhesive, can be provided.

Regarding the above-mentioned method of manufacturing the vehicle interior and exterior member, a foaming agent is added to the molten synthetic resin before the injection molding step.

One of the features and benefits of the present disclosure is as follows. In the injection molding step, a foaming agent may be preliminarily added to molten synthetic resin. Thus, gas can be supplied within the molten synthetic resin to efficiently form gas bubbles in the molten synthetic resin. The foaming agent may be a chemical foaming agent, such as an organic foaming agent or inorganic foaming agent that is capable of supplying gas to form gas bubbles in the synthetic resin member. Instead, the foaming agent may be a physical foaming agent that physically supplies gas.

Regarding a press mold used in manufacturing the above-mentioned vehicle interior and exterior member, the press mold may comprise an injection molding portion and a molding portion. The injection molding portion may have a passage comprised of a ferrous material or cast iron. The injection molding portion is configured to inject molten synthetic resin toward the fiber layer of the fiber laminated body. The molding portion may have a portion comprised of an aluminum alloy. The molding portion may be configured to mold the fiber laminated body into a three-dimensional face shape. The press mold may be configured by combining the injection molding portion and the molding portion.

One of the features and benefits of the present disclosure is that the press mold may have the injection molding portion. The injection molding portion may have a passage comprised of a ferrous material or cast iron, and the injection molding portion may be configured to inject molten synthetic resin toward the fiber layer of the fiber laminated body. The passage can be comprised of ferrous material or cast iron to maintain its rigidity, because the injection pressure is high. On the other hand, the press mold may have a molding portion comprised of an aluminum alloy. The molding portion may be configured to mold the fiber laminated body into a three-dimensional face shape. Because the press mold is configured to pressurize and cool the fiber laminated body from both of its surfaces, the press mold can be comprised of aluminum alloy to increase cooling efficiency. Further, the press mold may be preferably comprised of an aluminum alloy, which is lighter than a ferrous material or cast iron. This helps to reduce the weight of the movable mold portion of a press machine. In this way, the rigidity of the press mold can be ensured, and the weight of the press mold can be reduced. Additionally, its cooling efficiency can be improved. Thus, a press mold for manufacturing a vehicle interior and exterior member, which allows a synthetic resin member to be integrally attached on a fiber molded body without adhesives, such as a hot-melt adhesive, can be provided.

The present disclosure may adopt the above-mentioned means of each invention in order to provide a vehicle interior and exterior member which allows synthetic resin members to be integrally attached on a fiber molded body without adhesives such as a hot-melt adhesive, a manufacturing method for the vehicle interior and exterior member, and a press mold used for manufacturing the vehicle interior and exterior member.

DETAILED DESCRIPTION

An embodiment of the present disclosure is described below using FIGS. 1 to 7. A vehicle interior and exterior member, a method of manufacturing a vehicle interior and exterior member, and a press mold used for manufacturing a vehicle interior and exterior member are described by illustrating a luggage compartment trim, which is an automobile interior and exterior member and is a kind of a vehicle interior and exterior member, as an example. The luggage compartment trim in this embodiment may have a fiber molded body 2 and a synthetic resin member 4.

Figure 1:
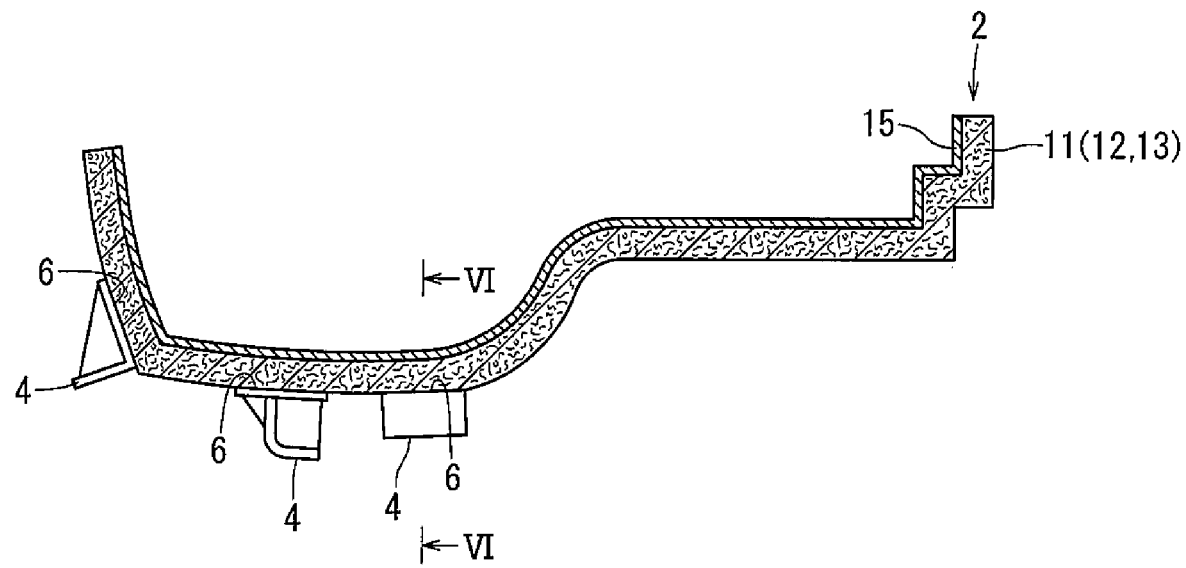
FIG. 1 is a front view schematically showing a luggage compartment trim according to an embodiment.
Figure 2:
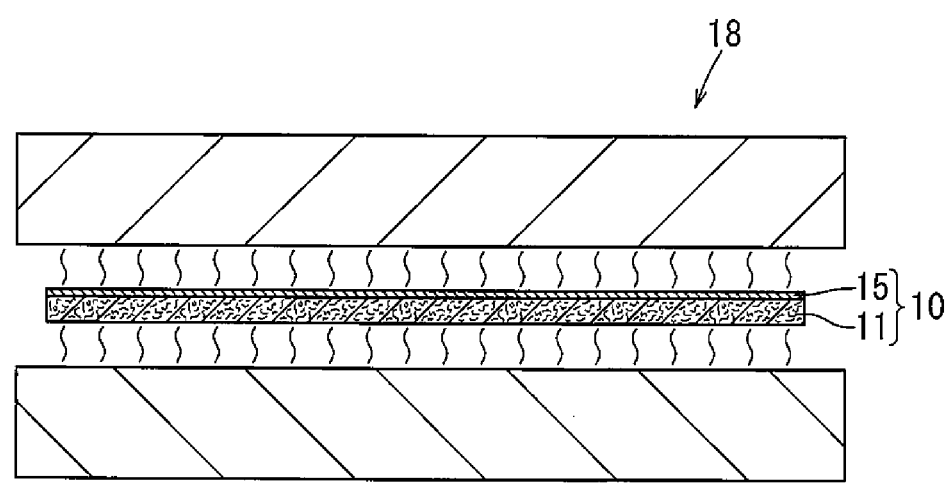
FIG. 2 is a sectional view schematically showing a state of a heating step according to an embodiment.

As illustrated in FIGS. 1 and 2, the fiber molded body 2 may have a three-dimensional face shape. The fiber molded body 2 can be formed by molding a fiber laminated body 10 having a fiber layer, which includes a thermoplastic synthetic resin, on a base material layer 11. The fiber laminated body 10 may have the fiber layer on both surfaces of the base material layer 11. Alternatively, the fiber laminated body 10 may have another fiber layer, which includes another type of thermoplastic synthetic resin, on one surface of the base material layer 11. In each configuration, the fiber laminated body 10 may have a face shape. The fiber molded body 2 may be formed from the fiber laminated body 10. The fiber laminated body 10 may have non-woven layers 15 on both of its surfaces. The non-woven layer 15 may form a fiber layer, including the other type of thermoplastic synthetic resin, and is provided separately from the base material layer 11.

Alternatively, the fiber laminated body 10 may have the non-woven layer 15 on one of its surfaces. The non-woven layer 15 may be provided separately from the base material layer 11. The fiber laminated body 10 may further have an air block layer, such as a resin film, which is laminated between the base material layer 11 and the non-woven layer 15. In this embodiment, as an example, the fiber molded body 2 has fiber layers on both of its surfaces, which include an attaching surface where a synthetic resin member 4 is to be attached and another side surface. These will be described later. Specifically, the attaching surface of the fiber molded body 2 is where a synthetic resin member 4 is to be attached. One side of the fiber molded body 2 may be formed as the fiber layer forming the base material layer 11. The other side surface of the fiber molded body 2 may have the non-woven layer 15, which is provided separately from the base material layer 11, attached thereto.

The fiber laminated body 10 may have a fiber mat including fiber reinforcement material 12 and thermoplastic synthetic resin 13. The fiber mat may act as the base material layer 11. This base material layer 11 may be formed by any manufacturing method, for example, a dry method, such as a cross-layer or air-laid method, or a wet method, such as a paper making method.

A base material layer 11 manufactured by a dry method, such as a cross-layer method or air-laid method, can be obtained, as described below. At first, fiber bodies of the fiber reinforcement material 12 and the thermoplastic synthetic resin 13 may be cut at a given length. Then, they can be mixed using air flow, called spreader or air laid (fiber blending). The mixed fibers may then be laminated to form a fiber laminated layer (fiber web), which is called fleece, having a given weight. After that, for example, fibers of the fleece may be entangled using a needle punch, or the fibers may be bonded to each other by heating. It is noted that the thermoplastic synthetic resin 13 used in the above-described dry method may be selected from thermoplastic synthetic resins, such as polyethylene fibers or polypropylene fibers.

A base material layer 11 manufactured by a wet method can be obtained as follows. At first, the fiber reinforcement material 12 and the thermoplastic synthetic resin 13 may be dispersed in water. Then, they are concentrated, for example, by using a net to form fleece, in a manner similar to that of making paper. The fleece is dried in a heater so that the fibers of the fleece are bonded each other. In this way, a fiber mat may be obtained. It is noted that the raw material of the thermoplastic synthetic resin 13 used in the wet method may be a powdery thermoplastic synthetic resin. The thermoplastic synthetic resin 13 formed in the wet method (the paper making method) may be manufactured from, for example, powdery polyethylene or powdery polypropylene.

The fiber reinforcement material 12 may be selected from inorganic fibers, such as glass fibers (e.g., chopped strands), or organic fibers, which are natural, such as jute, kenaf, ramie, hemp, sisal hemp, or bamboo. It is noted that the base material layer 11 may be a non-woven fabric sheet (e.g., a needle punch non-woven fabric) consisting of a fiber body of thermoplastic synthetic resin 13.

The synthetic resin member 4 may be fixed to surfaces of the fiber molded body 2. There are various types of synthetic resin members 4. For example, the synthetic resin member 4 may be a fixing member fixed to a vehicle body. The synthetic resin member may also be a deformation preventing member for preventing deformation of the face shape of the fiber molded body 2 or a rigidity securing member keeping the rigidity of the fiber molded body 2. The synthetic resin member 4 may generally be disposed on the back surface, opposite to a design surface exposed externally. However, the synthetic resin member 4 may be disposed on the design surface. The synthetic resin member 4 may have a fixed portion 6. The synthetic resin member 4 can be fixed to the fiber molded body 2 by solidifying the molten synthetic resin of the synthetic resin member 4 in a state where the molten synthetic resin may seep in the base material layer 11.

The synthetic resin member 4 may contain a foaming agent. The foaming agent can foam in a thickness direction of the base material layer 11. As a result, shrinking of molten synthetic resin can be inhibited when the molten synthetic resin is cooled. Additionally, bubbles produced by the forming agent can equalize the effects of cooling. The foaming agent may be a chemical foaming agent, such as an organic foaming agent or an inorganic foaming agent that is capable of producing a gas to form bubbles in the synthetic resin member 4. Alternatively, the foaming agent may be a physical foaming agent that is capable of physically supplying the gas, such as nitrogen gas or carbon dioxide gas, in an injection mold to foam the material therein. The amount of the foaming agent added may be preferably 1 wt % to 10 wt % per total weight of the synthetic resin member 4. If the amount added is over 10 wt % per total weight of the synthetic resin member 4, the rigidity of the synthetic resin member 4 may be decreased. More preferably, the amount of the foaming agent added may be 1 wt % to 5 wt % per total weight. This allows the rigidity to be ensured and the weight of the synthetic resin member 4 to be reduced. Additionally, this can inhibit the formation of sink marks along the design surface corresponding to the synthetic resin member 4. When it is unnecessary to consider the formation of sink mark in design surface, the foaming agent may not be added.

Figure 3:
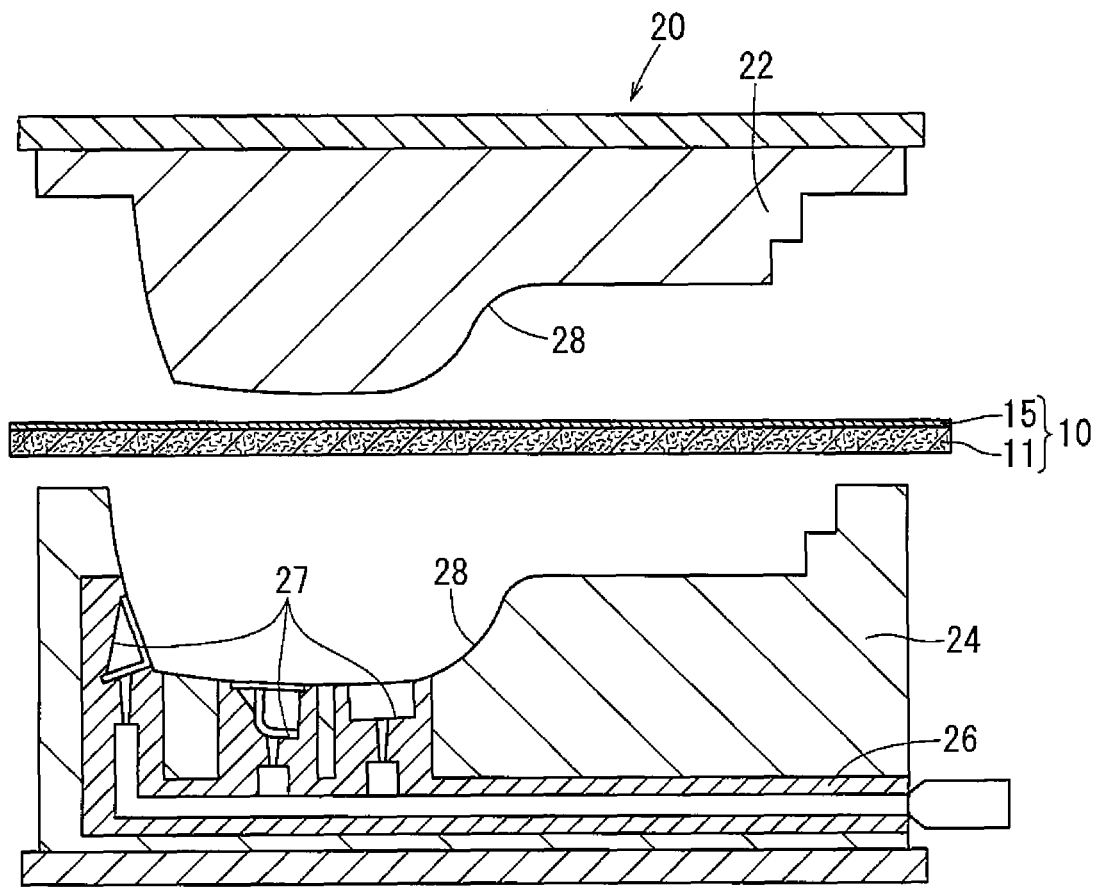
FIG. 3 is a sectional view schematically showing a state where a fiber laminated body heated in the heating step according to an embodiment is put between an upper mold and a lower mold of a press mold.
Figure 4:
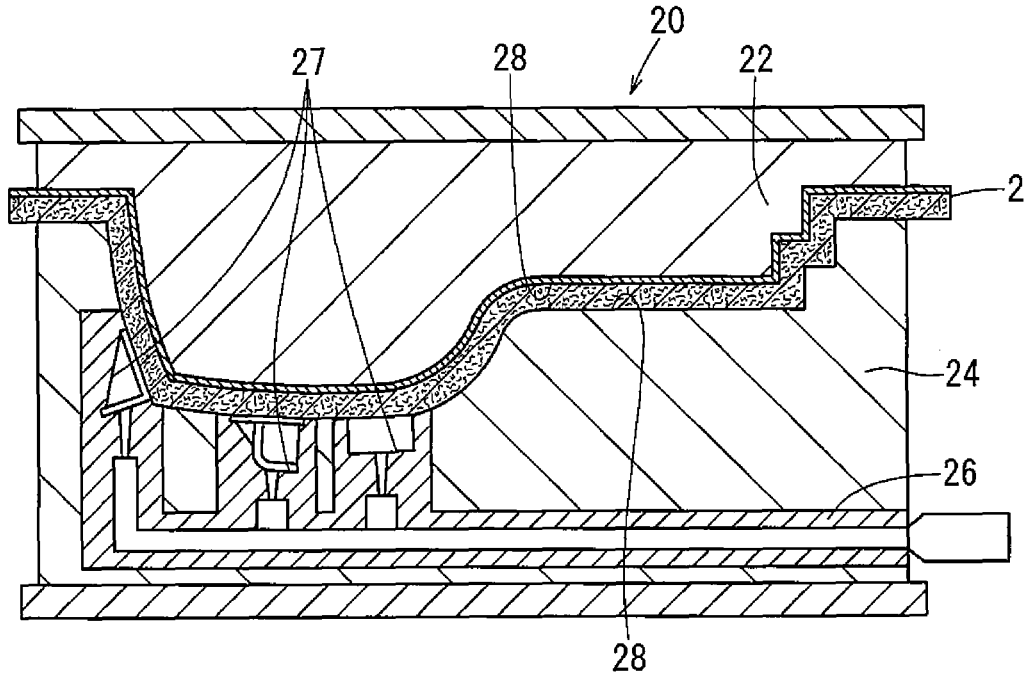
FIG. 4 is a sectional view schematically showing a state of a press molding step according to an embodiment.
Figure 5:
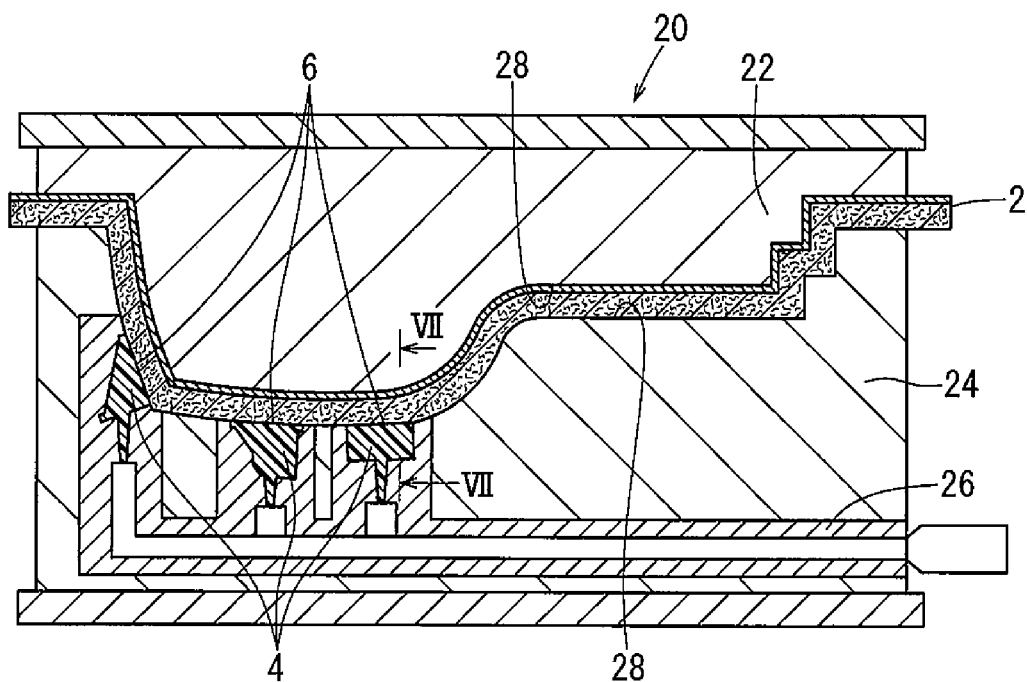
FIG. 5 is a sectional view schematically showing a state of an injection molding step according to an embodiment.

As illustrated in FIGS. 3 to 5, a press mold 20 may include an injection molding portion 26 and a molding portion 28. The injection molding portion 26 is comprised of, for example, a ferrous material or cast iron. The injection molding portion 26 may be formed as a passage to inject molten synthetic resin toward a surface of the base material layer 11 of the fiber laminated body 10. The molding portion 28 may be comprised of aluminum alloy. The molding portions 28 may be configured to mold the base material layer 11 into a three-dimensional face shape. The press mold 20 can be configured by mating the injection molding portion 26 and the molding portion 28. Specifically, the press mold 20 may have a movable upper mold 22 and a fixed lower mold 24. The upper mold 22 has the molding portion 28, which is a mold surface for molding the fiber molded body 2. At least the mold surface of the upper mold 22 may be comprised of aluminum alloy. The lower mold 24 may also have a molding portion 28 that is a mold surface for molding the fiber molded body 2. This molding portion 28 may also be comprised of aluminum alloy. The lower mold 24 may have passages comprised of, for example, a ferrous material or cast iron. The passages may be configured as a sprue, a runner, and/or a gate where molten synthetic resin is injected. The upper mold 22 and the lower mold 24 may have internal piping. The piping may be provided internally throughout the molds to flow a liquid coolant, such as cooling water, to suppress heating of the mold.

The manufacturing method for a luggage compartment trim (vehicle interior and exterior member) will be described below. The method may include a heating step (see FIG. 2), a press molding step (see FIG. 4), and an injection molding step (see FIG. 5). In the heating step, the fiber laminated body 10 may be heated so as to be softened. In the press molding step, the heated fiber laminated body 10 may be pressed by the press mold 20 along both of its both surfaces. The fiber laminated body 10 can be pressurized and cooled to form the fiber molded body 2. In the injection molding step, molten synthetic resin may be injected toward a surface of the base material layer 11 of the fiber laminated body 10. This causes the synthetic resin member 4 to be molded while the press molding step is proceeding.

In the heating step, as illustrated in FIG. 2, the fiber laminated body 10, having a base material layer 11 and a non-woven layer 15, is heated by a heating device 18, so as to soften the fiber laminated body 10. The heating temperature of the heating device 18 may have lower limit temperature higher than the softening point of the thermoplastic synthetic resin 13. The heating temperature of the heating device 18 may have an upper limit temperature lower than the melting point of the thermoplastic synthetic resin 13. The heating device 18 may be a device that allows the fiber laminated body 10 to be heated to its softening point. For example, the heating device 18 may be a hot-air generator, a hot plate press, an infrared heater, etc.

Then, as illustrated in FIG. 3, the fiber laminated body 10 (the base material layer 11 and the non-woven layer 15), which was heated in the heating step, may be put between the upper mold 22 and the lower mold 24 for the press molding step. In the press molding step, as illustrated in FIG. 4, the fiber laminated body 10 may be pressed by the press mold 20 along both of its surfaces, such that the fiber laminated body 10 can be pressurized and cooled to form the fiber molded body 2. In the press molding step, the mold temperature of the press mold 20 may be set in the range of 10° C. to 30° C. This can inhibit melting or deformation of the fiber molded body 2 due to an increase in temperature of molten synthetic resin, as described later. Also, this can promote cooling of the fiber molded body 2, which inhibits roughness and deformation of the design surface of the fiber molded body 2. More preferably, the mold temperature may be set in the range of 15° C. to 25° C.

As illustrated in FIG. 5, the press molding step and the injection molding step may be performed simultaneously. In the injection molding step, molten synthetic resin is injected toward a surface of the base material layer 11 of the fiber laminated body 10 to mold the synthetic resin member 4. In the injection molding step, the melting temperature of synthetic resin may set in the range of 200° C. to 270° C., in view of the fluidity of the molten synthetic resin. More preferably, the melting temperature may be set in the range of 200° C. to 250° C. Preferably, the fluidity of the molten synthetic resin may have a MFR (Melt Flow Rate) equal to or more than 40 g/10 min. The molten synthetic resin goes through a sprue, a runner, and a gate sequentially. Then, the molten synthetic resin may fill the injection molding channels 27 (see FIG. 4), which are formed in a shape of the synthetic resin member 4, and then seep into the fiber layer of the base material layer 11. When the molted synthetic resin foams due to a forming agent, the foaming direction is limited by the injection molding channels 27. In this way, the molted synthetic resin can seep in the fiber layer while foaming toward the fiber layer of the base material layer 11. Further, the mold temperature may be set in the above-mentioned temperature range by the coolant. This can promote cooling of the fiber molded body 2 to inhibit roughness or deformation of the design surface of the fiber molded body 2. The molten synthetic resin may be formed and solidified in a given shape by the injection molding channels 27. In this way, the synthetic resin member 4 may be produced. Thus, the synthetic resin member 4 may have a fixed portion 6, which is fixed to the fiber molded body 2 by solidifying the synthetic resin member 4 in a state that a portion of the molten synthetic resin seeps into the fiber layer of the base material layer 11. That is, the synthetic resin member 4 can be firmly fixed to the fiber molded body 2 by the anchoring effect of the fixed portion 6.

Figure 6:
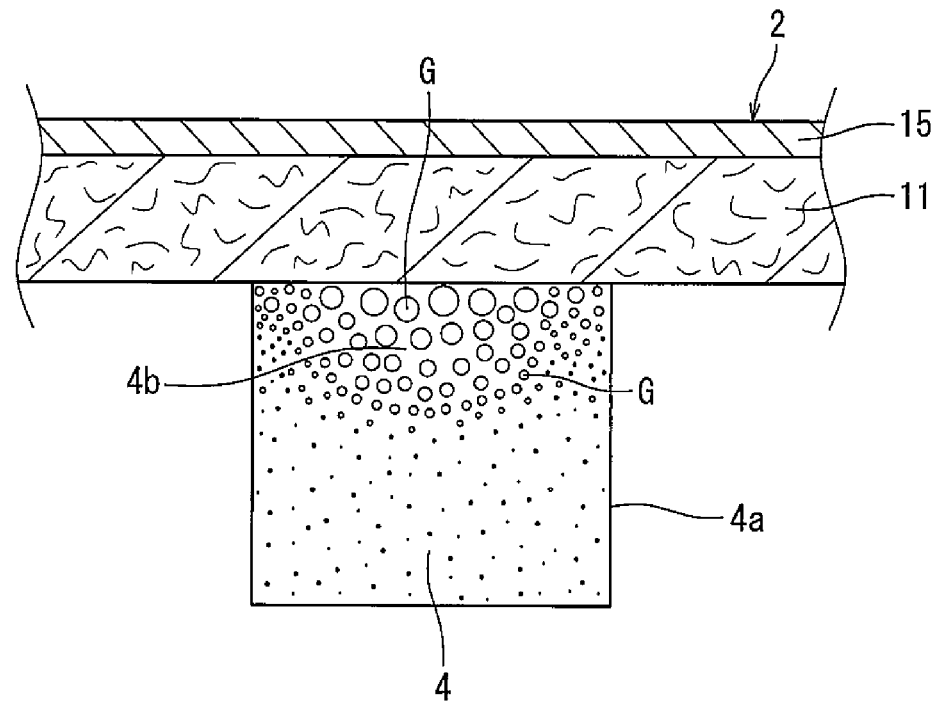
FIG. 6 is a sectional view taken along line VI-VI of FIG. 1.
Figure 7:
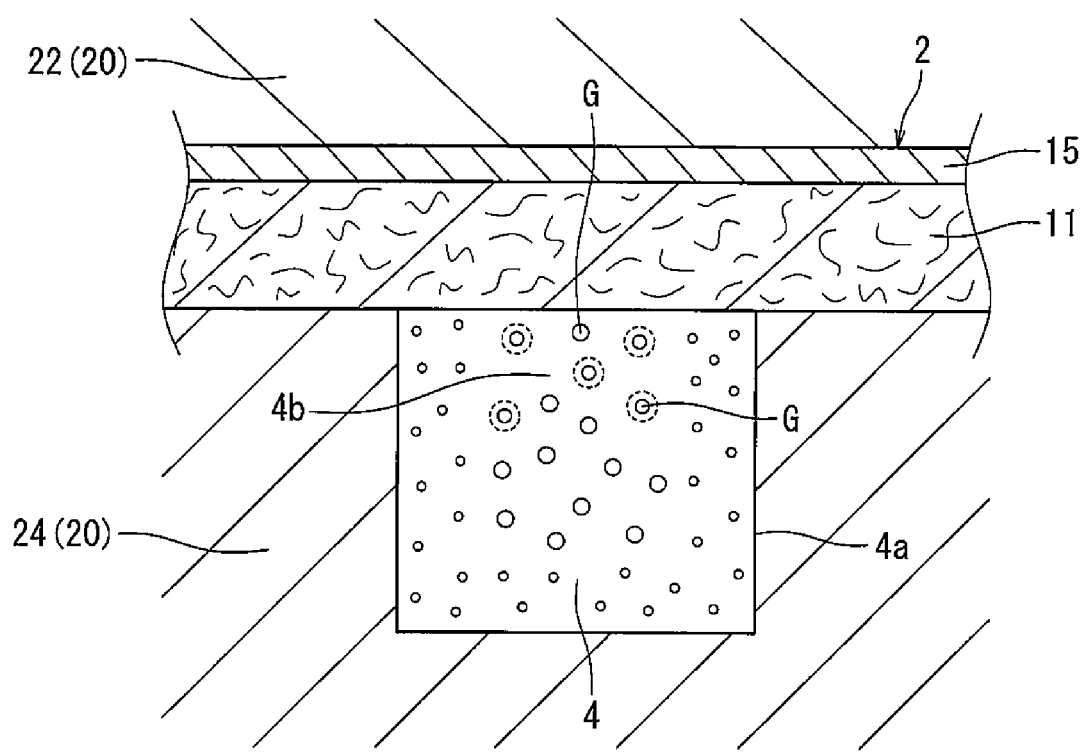
FIG. 7 is a sectional view taken along line VII-VII of FIG. 5.

As illustrated in FIG. 6, the synthetic resin member 4 is solidified in a state where it includes gas bubbles G inside, as seen in the sectional view. Specifically, the gas bubbles G located toward an inside 4b of the synthetic resin member 4 may be relatively larger than the gas bubbles G located nearer the surface sides 4a. The gas bubbles G may be concentrated at a portion near the base material layer 11. As illustrated in FIG. 7, the surface sides 4a of the synthetic resin member 4 can be cooled faster than the inside 4b, because the surface sides 4a can be cooled by the lower mold 24 of the press mold 20. Thus, the surface sides 4a can be solidified before the gas bubbles G near the surface sides 4a have an opportunity to grow further. On the other hand, the gas bubbles G located toward the inside 4b can grow bigger, because the inside 4b of the synthetic resin member 4 is cooled more slowly than the surface sides 4a. This may allow the rigidity of the synthetic resin member 4 to be ensured, while also allowing the weight of the synthetic resin member 4 to be reduced. The gas bubbles G are concentrated in a portion near the base material layer 11, which was heated in the heating step. That is, relatively big gas bubbles G are concentrated in the inside 4b of the synthetic resin member 4 near the base material layer 11. These gas bubbles G are relatively big as compared to the gas bubbles G formed nearer the surface side 4a of the synthetic resin member 4. This also allows the rigidity of the synthetic resin member 4 to be ensured, while also allowing the weight of the synthetic resin member 4 to be reduced. Additionally, this can inhibit formation of sink marks on the design surface.

Thus, according to the above described luggage compartment trim (a vehicle interior and exterior member), the manufacturing method for the luggage compartment trim, and the press mold 20 used for manufacturing the luggage compartment trim, the synthetic resin member 4 has a fixed portion 6 that is fixed to the fiber molded body 2. Specifically, the fixed portion 6 may be fixed to the fiber molded body 2 by solidifying the fixed portion 6 in a state that a portion of the molten synthetic resin seeps into the base material layer 11. The synthetic resin member 4 can be firmly fixed to the fiber molded body 2 by an anchoring effect. Additionally, the synthetic resin member 4 does not need an attaching seat surface, and thus an increase in its weight can be inhibited. In this way, a luggage compartment trim that allows the synthetic resin member 4 to be integrally attached to the fiber molded body 2 without adhesives, such as a hot-melt adhesive, can be provided.

The synthetic resin member 4 is solidified in a state with gas bubbles G inside, as seen in the sectional view. This can inhibit formation of sink marks on a surface of the fiber molded body 2, located on an opposite side of an attaching surface where the synthetic resin member 4 is attached. A sink mark is a recess that can be formed due to shrinkage of synthetic resin during cooling. Because the molten synthetic resin can be solidified with gas bubbles G inside, shrinkage of the resin may be inhibited during cooling. This allows a design surface of a luggage compartment trim to be more beautifully finished.

When the gas bubbles G formed inside the resin members 4 are relatively larger than the gas bubbles G located near the side surfaces of the resin members 4, the rigidity of the synthetic resin member 4 can be ensured and the weight of the synthetic resin member 4 can be reduced.

If the gas bubbles G formed inside the resin member 4 are concentrated in a portion nearer the fiber layer, the rigidity of the synthetic resin member 4 can be ensured and the weight of the synthetic resin member 4 can be reduced. Additionally, this can further inhibit formation of sink marks on the design surface.

The manufacturing method for the luggage compartment trim includes an injection molding step. During the press molding step, the injection molding step may also be performed. During the press molding step, molten synthetic resin may be injected toward the fiber layer of the fiber laminated body 10 so as to mold the synthetic resin member 4. In this step, the molten synthetic resin may be injected in a state of including gas (or a chemical agent to produce gas) to produce gas bubbles G. Thus, equipment, such as jig, is unnecessary when attaching the synthetic resin member 4. The positioning accuracy of the synthetic resin member 4 can also be increased due to simultaneously performing the press molding step and the injection molding step. In this way, the method of manufacturing a luggage compartment trim that allows for the synthetic resin member 4 to be integrally attached to the fiber molded body 2 without adhesives such as a hot-melt adhesive can be provided.

In the injection molding step, a foaming agent may be preliminarily added to the molten synthetic resin. Thus, gas can be supplied to the molten synthetic resin in order to efficiently form gas bubbles G in the molten synthetic resin. The foaming agent may be a chemical foaming agent, such as an organic foaming agent or inorganic foaming agent. The chemical foaming agent is a substance that reacts to supply gas to form gas bubbles G in the synthetic resin member 4. Further, the foaming agent may be a physical foaming agent that physically supplies gas.

The amount of the foaming agent added may be 1 wt % to 10 wt % per total weight of the synthetic resin member 4. This allows the rigidity of the synthetic resin member 4 to be ensured, while also allowing the weight of the synthetic resin member 4 to be reduced. Additionally, formation of sink marks on the design surface can be inhibited.

In the press molding step, the mold temperature of the press mold 20 may be set in the range of 10° C. to 30° C. This can inhibit melting or deformation of the fiber molded body 2 due to the increased temperature of the molten synthetic resin. Also, this can promote cooling of the fiber molded body 2 to inhibit roughness or deformation of the design surface of the fiber molded body 2. In the injection molding step, the melting temperature of synthetic resin may be set in the range of 200° C. to 270° C. This can inhibit a loss of fluidity of the molten synthetic resin, even if the mold temperature of the press mold 20 is set to the above-mentioned temperature.

The press mold 20 may include the injection molding portion 26, comprised of a ferrous material or cast iron. The injection molding portion 26 may be formed as a passage for injecting molten synthetic resin toward the fiber layer of the fiber laminated body 10. The passage can be comprised of a ferrous material or cast iron. These materials will help maintain its rigidity, even if the injection pressure is high. On the other hand, the molding portion 28 of the press mold 20 may be comprised of an aluminum alloy. The molding portion 28 is configured to mold the fiber laminated body 10 into a three-dimensional face shape. Because the press mold 20 is configured to pressurize and cool the fiber laminated body 10 from both of its surfaces, the press mold 20 can be comprised of aluminum alloy in view of its cooling efficiency. Further, the press mold 20 may preferably be comprised of an aluminum alloy, which is lighter than a ferrous material or cast iron, to reduce the weight of the movable mold of the press machine. In this way, the rigidity of the press mold 20 can be ensured, and the weight of the press mold 20 can be reduced. Additionally, its cooling efficiency can be improved. Thus, a press mold 20 for manufacturing a luggage compartment trim, which allows for a synthetic resin member 4 to be integrally attached to a fiber molded body 2 without adhesives, such as a hot-melt adhesive, can be provided.

Although the embodiment of the present disclosure was described as above, the vehicle interior and exterior member, the manufacturing method for the vehicle interior and exterior member, and the press mold used for manufacturing the vehicle interior and exterior member of the present disclosure are not limited to such embodiment and may be carried out in other kinds of manner.

The vehicle interior and exterior member of the present embodiment may include both of a vehicle interior member and a vehicle exterior member. For example, in addition to luggage compartment trims, the vehicle interior members may be applied to door trims, rear parcel shelves, floor trims, trunk trims, rear side trims, pillar garnishes, and roof trims. For example, the vehicle exterior members may be applied to under covers (e.g., engine undercovers and floor covers) disposed under the floors of vehicles and wheel house protectors. The vehicle exterior members, such as under covers or wheel house protectors, may be designed to prevent adhesion of snow and ice and collision of flying stones. Additionally, the vehicle exterior members may be designed to have smooth surfaces. Thus, the fiber molded body may be preferably formed by a wet method.

The invention claimed is:

1. A vehicle interior and exterior member, comprising:
a fiber molded body and a synthetic resin member affixed to a surface of the fiber molded body,
wherein the fiber molded body has a first fiber layer including a first thermoplastic synthetic resin, as a base material layer, a second fiber layer including a second thermoplastic synthetic resin on one of the first fiber layer surfaces to form a fiber laminated body, the first and the second thermoplastic synthetic resins are different,
wherein the fiber molded body is formed by molding the fiber laminated body into a three-dimensional face shape, wherein the synthetic resin member comprises a foaming agent, wherein the synthetic resin member has a fixed portion which is fixed to the fiber molded body by solidifying in a state that where molten synthetic resin seeps into a part of the first fiber layer of the fiber laminated body that faces the synthetic resin member, and wherein the synthetic resin member is solidified in a state where the synthetic resin member includes gas bubbles therein.

2. The vehicle interior and exterior member according to claim 1, wherein the gas bubbles located in an inside of the synthetic resin member are relatively larger than the gas bubbles located adjacent a surface of the synthetic resin member.

3. The vehicle interior and exterior member according to claim 1, wherein the gas bubbles in the synthetic resin member are concentrated in a portion of the synthetic resin member adjacent the first fiber layer.

4. The vehicle interior and exterior member according to claim 1, wherein the gas bubbles are larger along a central axis of the synthetic resin member passing through the first fiber layer than the gas bubbles located away from the central axis of the synthetic resin member.

5. The vehicle interior and exterior member according to claim 4, wherein the gas bubbles are larger nearer the first fiber layer than the gas bubbles located further from the first fiber layer.

6. The vehicle interior and exterior member according to claim 1, wherein a concentration of the gas bubbles nearer the first fiber layer is greater than a concentration of gas bubbles located further from the first fiber layer.

7. The vehicle interior and exterior member according to claim 1, wherein a melting point of the first or the second thermoplastic synthetic resin is the same or greater than a melting point of the synthetic resin member.

8. A method of manufacturing a vehicle interior and exterior member,

The vehicle interior and exterior member comprising:
a fiber molded body and a synthetic resin member affixed to a surface of the fiber molded body,
wherein the fiber molded body has a first fiber layer including a first thermoplastic synthetic resin, as a base material layer, a second fiber layer including a second thermoplastic synthetic resin on one of the first fiber layer surfaces to form a fiber laminated body, the first and the second thermoplastic synthetic resins are different,
wherein the fiber molded body is formed by molding the fiber laminated body into a three-dimensional face shape,
wherein the synthetic resin member comprises a foaming agent,
wherein the synthetic resin member has a fixed portion which is fixed to the fiber molded body by solidifying in a state that where molten synthetic resin seeps into a part of the first fiber layer of the fiber laminated body that faces the synthetic resin member, and
wherein the synthetic resin member is solidified in a state where the synthetic resin member includes gas bubbles therein;

the method comprising the steps of:
heating the fiber laminated body, the fiber laminated body comprising the first fiber layer and the second fiber layer covering the first fiber layer, to soften the fiber laminated body;
press molding the softened fiber laminated body using a press mold;
cooling and pressurizing the fiber laminated body in the press mold to form a fiber molded body; and
injection molding molten synthetic resin toward the first fiber layer of the fiber laminated body while the fiber laminated body is in the press mold,
wherein the foaming agent is configured to form gas bubbles in the molten synthetic resin.

9. The method of manufacturing the vehicle interior and exterior member according to claim 8, further comprising the step of cooling the molten synthetic resin while the fiber laminated body is in the press mold.

10. The method of manufacturing the vehicle interior and exterior member according to claim 9, wherein a portion of the molten synthetic resin nearer the first fiber layer is cooled slower than a portion of the molten synthetic resin spaced apart from the first fiber layer.

11. The method of manufacturing the vehicle interior and exterior member according to claim 8, wherein, in the injection molding step, a sufficient quantity of molten synthetic resin is injected to cause a portion of the molten synthetic resin to seep into the first fiber layer.

12. The method of manufacturing the vehicle interior and exterior member according to claim 8, wherein the press mold includes:
an injection molding portion; and a molding portion, wherein:
the injection molding portion has a passage comprised of a ferrous material or cast iron, the passage being configured to inject molten synthetic resin toward the fiber layer of the fiber laminated body,
the molding portion has a portion comprised of aluminum alloy, the molding portion being configured to mold the fiber laminated body into the three-dimensional face shape, and
the press mold is configured by combining the injection molding portion and the molding portion.

* * * * *